United States Patent [19]
Ooka et al.

[11] Patent Number: 5,631,840
[45] Date of Patent: May 20, 1997

[54] METHODS AND APPARATUSES FOR GENERATING SCULPTURED SURFACES

[75] Inventors: Miwa Ooka; Tetsuzo Kuragano, both of Tokyo, Japan

[73] Assignee: Sony Corporation, Tokyo, Japan

[21] Appl. No.: 425,642

[22] Filed: Apr. 20, 1995

[30] Foreign Application Priority Data

Apr. 28, 1994 [JP] Japan .................... 6-114783

[51] Int. Cl.⁶ .................................................. G06F 19/00
[52] U.S. Cl. .................... 364/474.24; 364/474.29
[58] Field of Search ................ 364/474.24, 474.29; 318/568.1, 573; 395/119, 120, 141–143

[56] References Cited

U.S. PATENT DOCUMENTS

| | | | |
|---|---|---|---|
| 4,866,631 | 9/1989 | Kuragano et al. | 364/474.29 |
| 5,065,348 | 11/1991 | Kuragano et al. | |
| 5,345,546 | 9/1994 | Harada et al. | 395/142 |
| 5,410,645 | 4/1995 | Ooka et al. | 395/142 |

FOREIGN PATENT DOCUMENTS

| | | | |
|---|---|---|---|
| 0393680A3 | 10/1990 | European Pat. Off. | G06F 15/353 |
| 0504889A2 | 9/1992 | European Pat. Off. | G06F 15/72 |
| 62-135965 | 6/1987 | Japan | G06F 15/60 |
| 62-151978 | 6/1987 | Japan | G06F 15/60 |
| 62-157968 | 7/1987 | Japan | G06F 15/60 |
| 62-173569 | 7/1987 | Japan | G06F 15/60 |
| 62-190564 | 8/1987 | Japan | G06F 15/60 |
| 62-216076 | 9/1987 | Japan | G06F 15/60 |
| 62-221073 | 9/1987 | Japan | G06F 15/69 |
| 62-224863 | 10/1987 | Japan | G06F 15/60 |
| 62-226281 | 10/1987 | Japan | G06F 15/60 |
| 1-175672 | 7/1989 | Japan | G06F 15/60 |
| 5-35826 | 2/1993 | Japan | G06F 15/60 |

OTHER PUBLICATIONS

Les Piegl, University of S. Florida, "On NURBS: A Survey," IEEE Computer Graphics and Applications II (1991) Jan., No. 1, Los Alamitos, CA, pp. 55–71.

L. Piegl, "Key Developments in Computer-Aided Geometric Design," vol. 21, No. 5, Jun. 1989, London, GB, pp. 262–273.

*Primary Examiner*—Paul P. Gordon
*Assistant Examiner*—Steven R. Garland
*Attorney, Agent, or Firm*—Limbach & Limbach LLP

[57] ABSTRACT

A method and an apparatus for generating sculptured surfaces which enables a sculptured surface of a specified radius to be generated easily between two free curves. A plurality of base points are set on a first free curve, and a plurality of planes are generated at each of the base points using, as the normal, a tangent of the first free line, the planes including that base point. A plurality of intersections of the second free curve and the plurality of planes are determined. A plurality of circular arcs of a specified radius are generated on each of the plurality of planes using the base point and the intersection as endpoints. A sculptured surface is then generated based on the first free curve, the second free curve, and the plurality of circular arcs.

6 Claims, 9 Drawing Sheets

METHODS AND APPARATUSES FOR GENERATING SCULPTURED SURFACES

BACKGROUND OF THE INVENTION

1. Field of the Invention

The present invention relates to methods and apparatuses for generating sculptured surfaces for use with the designing apparatus for CAD/CAM (computer aided design/computer aided manufacturing) applications.

2. Description of the Related Art

In a geometric modeling application where an object with a sculptured surface is to be designed, the designer designates a plurality of points (called nodes) in the three-dimensional space to be traversed by that surface. The designated nodes are calculated using a desired vector function so that the nodes are connected by a boundary curve network. This provides a surface expressed by what is known as a wire frame. In this manner, there are generated a large number of frame spaces enclosed by boundary curves (this is called a framing process).

The boundary curve network generated by the framing process presents itself approximately as what the designer wants to design. In this case, a surface may be interpolated as the expression of a predetermined vector function using the boundary curves that enclose each frame space. Taken as a whole, this is the sculptured surface designated by the designer (and not defined by secondary functions). Each surface occupying each frame space constitutes a component that makes up the entire surface. The component is called a patch.

As disclosed in a Japanese Laid-Open Patent Application 62-135965 published in June 1987, there was proposed a free curve generating method whereby the control side vectors around a common boundary between two adjacent frame spaces are modified in order to establish a patch that will satisfy the condition for tangent plane condition on that common boundary. The major object of this prior art method is to provide the entire sculptured surface with a more natural external shape.

Figure 1:
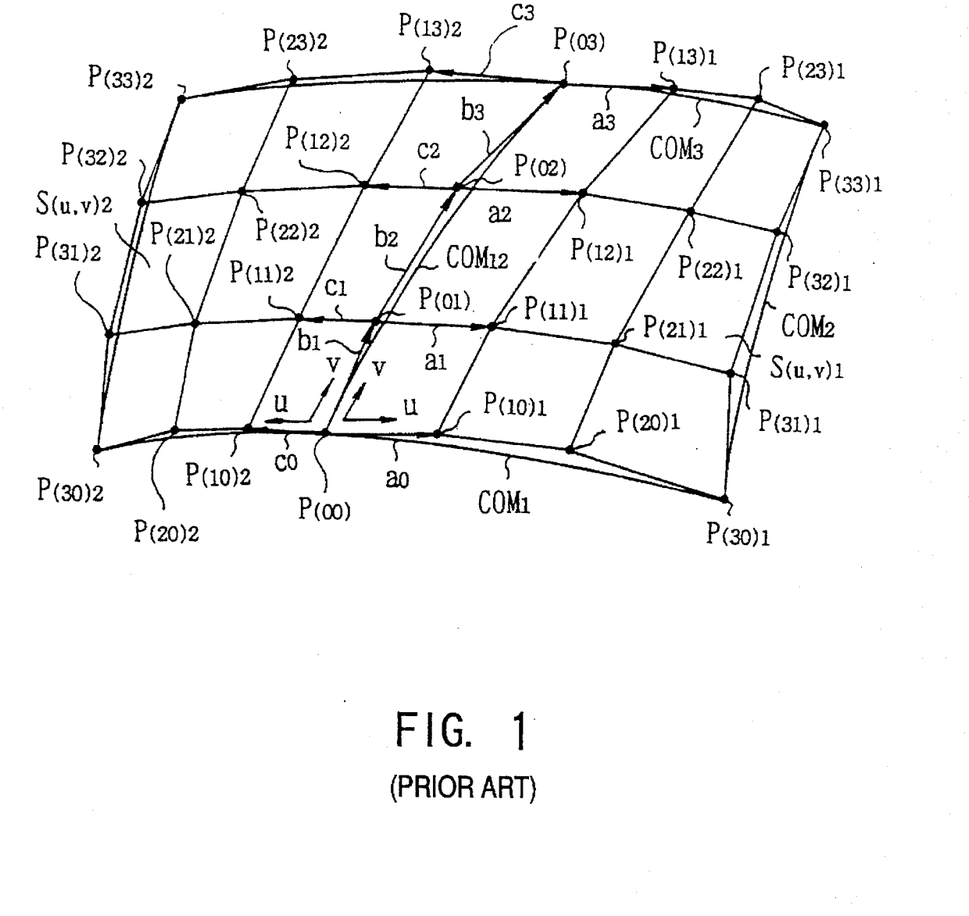
FIG. 1 is a schematic view explaining the prior art sculptured surface.

FIG. 1 shows the prior art sculptured surface generating method involves first locating a patch vector S(u,v)1 and a patch vector S(u,v)2 in a rectangular frame space and having them expressed by a vector function S(u,v) constituting a cubic Bezier equation. The two patch vectors S(u,v)1 and S(u,v)2 are connected smoothly as follows. When node vectors P(00), P(30)1, P(33)1, P(03), P(33)2, and P(30)2 are furnished by the framing process, there are accordingly established control side vectors a1, a2, c1, and c2 in such a manner that the condition for tangent plane continuation is met on a common boundary COM between adjacent patch vectors S(u,v)1 and S(u,v)2. These control side vectors are used to modify control point vectors P(11)1, P(12)1, P(11)2, and P(12)2.

The above method is applied consecutively to other common boundaries. This eventually results in the smooth connection of the patch vectors S(u,v)1 and S(u,v)2 on the condition of tangent plane continuation with the adjacent patches. The vector function S(u,v) constituted by a cubic Bezier equation is expressed as:

$$S(u,v)=(1-u+uE)^3(1-v+vF)^3 P(00) \quad (1)$$

where, "u" and "v" are parameters for "u" and "v" directions respectively, and E and F are shift operators. Furthermore, the vector function S(u,v) has those relations with a control point vector P(ij) which are defined as:

$$E \cdot P(ij)=P(i+1\,j) \quad (i,j=0,1,2) \quad (2)$$

$$E \cdot P(ij)=P(i\,j+1) \quad (i,j=0,1,2) \quad (3)$$

$$0 \leq u \leq 1 \quad (4)$$

$$0 \leq v \leq 1 \quad (5)$$

The tangent plane is a plane formed by tangent vectors in the "u" and "v" directions at each of the nodes on a common boundary. For example, where the patch vectors S(u,v)1 and S(u,v)2 in FIG. 1 share the same tangent plane on a common boundary COM12, the condition of tangent plane continuation is met.

The above prior art method allows the designer to design cubic shapes that are otherwise difficult to design, such as those whose surfaces change smoothly.

Quality design reflecting the sensitivity of the designer may be obtained by using such a designing apparatus to generate between two free curves spaced at a non-uniform distance in the three-dimensional space, a sculptured surface corresponding to a track obtained by rotating a sphere. In this case, one of the free curves is used as a base line, while the other is used as a relative line. A plane is defined using, as the normal, a tangent at each point on the base line, and the intersection of each of the defined planes and the relative line is determined. This is inconvenient in that as many planes as the points on the base line must be defined and that the intersections of all the planes and the relative line must be determined.

In addition, circular arcs of a specified radius are generated on each of the planes using a point on the base line and the corresponding intersection on the relative line as endpoints. Since these circular arcs are generated using the point on the base line and the intersection on the relative line, the center of the circular arc must be determined. Processing for selecting between two circular arcs generated is also required. Since this processing must be performed for all the points on the base line, it takes a large amount of time and inconvenience.

Furthermore, although such a group of circular arcs are converted into a free curve patch to generate a sculptured surface between the two free lines, a free curve patch cannot be generated easily from a group of circular arcs, resulting in an inaccurate patch. In addition, sculptured surfaces generated may have a non-uniform curvature, and a sculptured surfaces cannot be generated easily when curves have very inconstant geometries.

SUMMARY OF THE INVENTION

In view of the foregoing, an object of this invention is to provide a methods and an apparatuses for generating sculptured surfaces which enable a sculptured surface of a specified radius to be generated easily between two free curves.

The foregoing object and other objects of the invention have been achieved by the provision of a method for generating a sculptured surface corresponding to the track of a sphere rotated between a first and a second free curves in the three-dimensional space, comprising the steps of: setting a plurality of base points Qi on the first free curve A; generating a plurality of planes PLi using, as the normal, a tangent Vi of the first free line A at each of the base points Qi, the planes including that base point Qi; determining a plurality of intersections Pi of the second free curve B and the plurality of planes PLi; generating a plurality of circular arcs ARCi of a specified radius on each of the plurality of planes PLi using the base point Qi and the intersection Pi as endpoints, and generating a sculptured surface based on the first free curve A, the second free curve B, and the plurality of circular arcs ARCi.

This invention also comprises a plane generation means for setting a plurality of base points Qi on the first free curve A and generating a plurality of planes PLi using, as the normal, a tangent Vi of the first free line A at each of the base points Qi, the planes including that base point Qi; an intersection detection means for determining a plurality of intersections Pi of the second free curve B and the plurality of planes PLi generated by the plane generation means; a circular arc generation means for generating a plurality of circular arcs ARCi of a specified radius on each of the planes PLi using the base point Qi and the intersection Pi as endpoints; and a sculptured surface generation means for generating a sculptured surface based on the first free curve A, the second free curve B, and the plurality of circular arcs ARCi.

A sculptured surface of a specified radius can be generated easily between two free curves by setting a plurality of base points Qi on the first free curve A; generating a plurality of planes PLi using, as the normal, a tangent Vi of the first free line A at each of the base points Qi, the planes including that base point Qi; determining a plurality of intersections Pi of the second free curve B and the plurality of planes PLi; generating a plurality of circular arcs ARCi of a specified radius using the base point Qi and the intersection Pi as endpoints on each of the plurality of planes PLi, and generating a sculptured surface based on the first free curve A, the second free curve B, and the plurality of circular curves ARCi.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of the invention will be described with reference to the accompanying drawings:

(1) Overall configuration of CAD/CAM system

Figure 2:
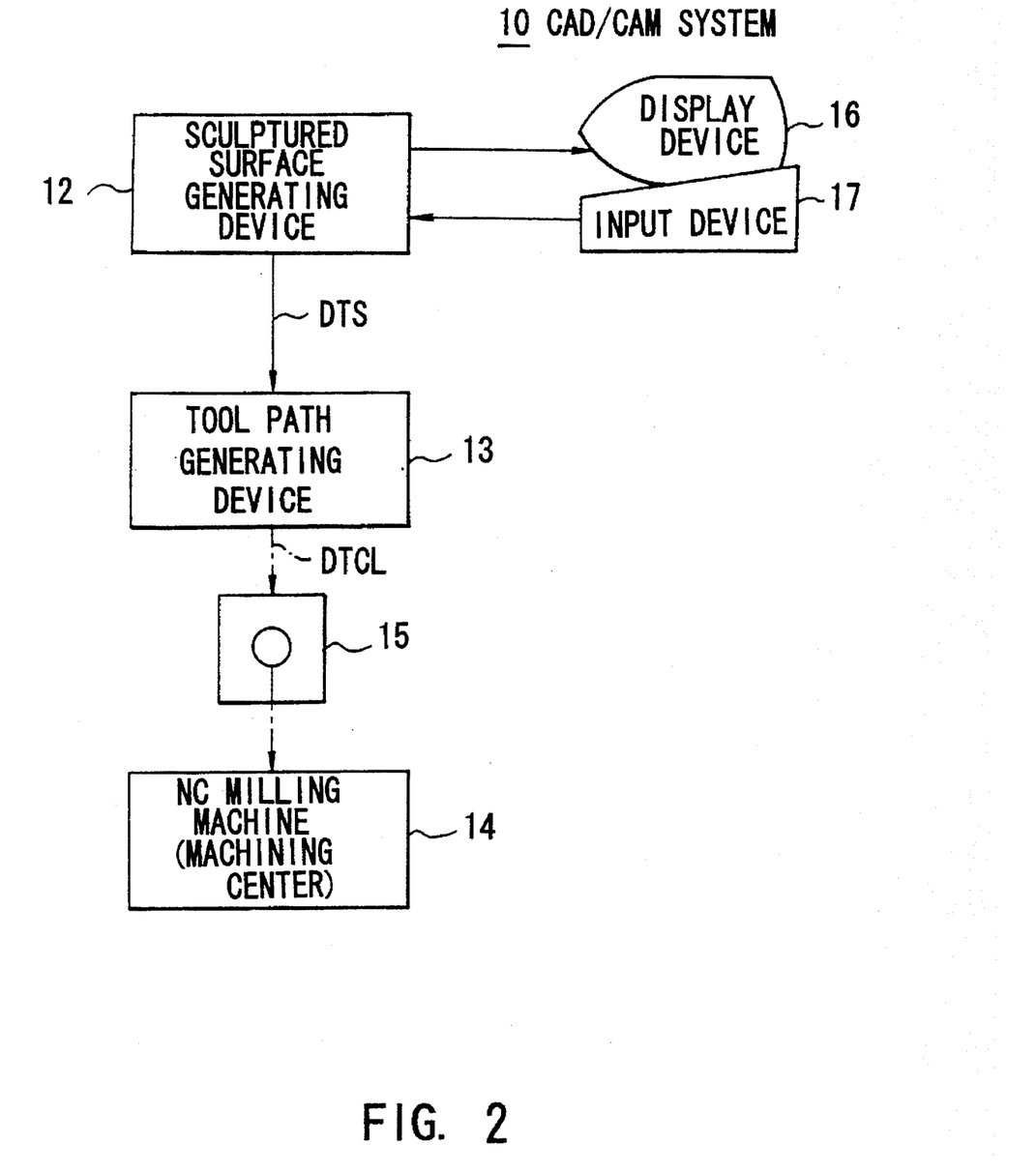
FIG. 2 is a block diagram showing the overall configuration of an embodiment of a CAD/CAM system to which a method and an apparatus for generating sculptured surfaces according to this invention are applied.

In FIG. 2, reference numeral 10 is a typical CAD/CAM system in its entirety to which the invention is applied. A sculptured surface generating device 12 generates shape data DTS representing a sculptured surface. After generation of the shape data DTS, a tool path generating device 13 generates cutting data DTCL for cutting work.

The sculptured surface generating device 12 has a central processing unit (CPU) that controls a display 16. The designer responds to indications on the display 16 and operates an input device 17 accordingly. In doing so, the designer designates a wire frame model and establishes therein a patch using a cubic Bezier equation. The patch is then modified in order to generate the shape data DTS representing the desired object having a sculptured surface.

Using the shape data DTS, the tool path generating device 13 generates the cutting data DTCL for roughing and finishing a metal die. Thereafter, the cutting data DTCL is output illustratively via a floppy disk 15 to a numerically controlled (NC) milling machine 14. The NC milling machine 14 illustratively drives an NC miller using the cutting data DTCL. This completes work on the metal die by which to produce the product represented by the shape data DTS.

(2) Principles of free curve

Figure 3:
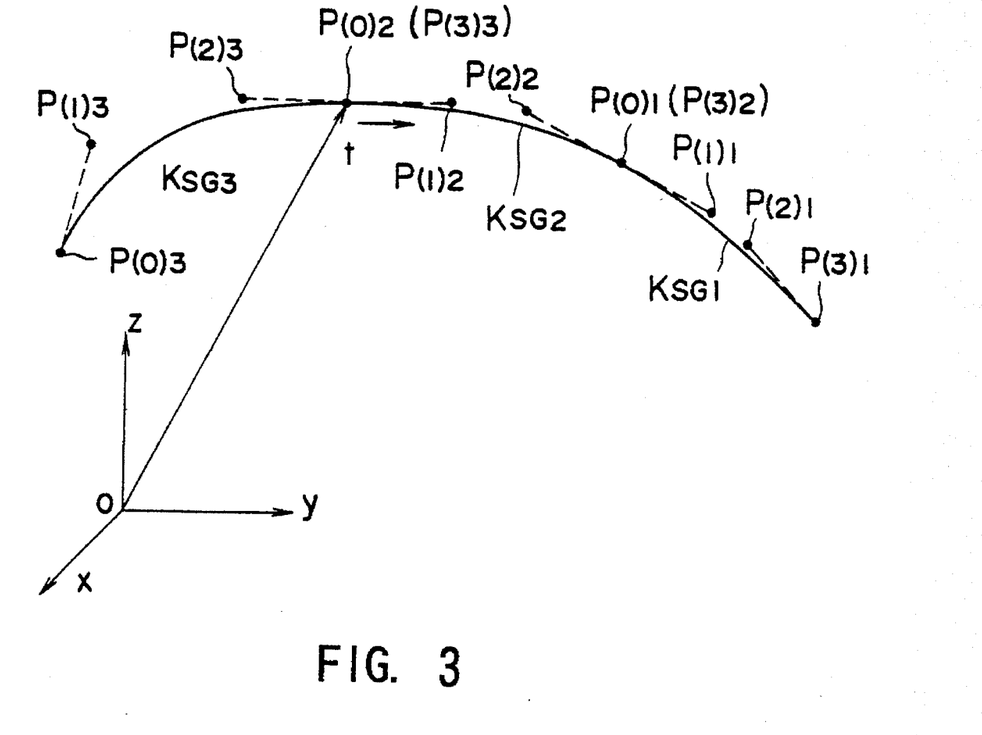
FIG. 3 is a schematic diagram explaining a method for expressing a free curve by a vector function.

As shown in FIG. 3, a Bezier curve is expressed by use of a cubic Bezier equation representing a parametric space curve vector R(t) given as:

$$R(t)=(1-t+tE)^3 P0 \qquad (6)$$

where "t" is the parameter varying from "0" to "1", i.e., $$0 \leq t \leq 1 \qquad (7)$$

The range of (7) above holds from a node vector P0 to another node vector P3 along a curve segment KSG.

Two control point vectors P1 and P2 are designated using a shift operator E between the node vectors P0 and P3. The curve segment KSG, expressed by the cubic Bezier equation, is represented by the points given by the position vector R(t) relative to origin 0 of an XYZ space, the vector being furnished by expanding the equation:

$$R(t)=(1-t)^3 P0+3(1-t)^2 tP1+3(1-t)t^2 P2+t^3 P3 \qquad (8)$$

The shift operator E has certain relations with control point vectors Pi on the curve segment KSG, the relations being given as:

$$E \cdot Pi = Pi+1 \qquad (9)$$

Where, $$i=0, 1, 2 \qquad (10)$$

When Equation (6) is expanded and Equation (9) is inserted therein, one gets:

$$\begin{aligned}
R(t) &= (1-t+tE)^3 P0 \quad (11)\\
&= \{(1-t)^3+3(1-t)^2 tE+3(1-t)t^2E^2+t^3E^3\}P0\\
&= (1-t)^3 P0+3(1-t)^2 tEP0+3(1-t)t^2E^2P0+t^3E^3P0\\
&= (1-t)^3 P0+3(1-t)^2 tP1+3(1-t)t^2P2+t^3P3
\end{aligned}$$

As a result of this, Equation (8) is obtained.

Thus the curve segments KSG1, KSG2, and KSG3 expressed by the Bezier curve are represented by two node vectors and two control point vectors each, i.e., P(0)1 through P(0)3, P(1)1 through P(1)3, P(2)1 through P(2)3, and P(3)1 through P(3)3, based on Equation (8). When the control point vectors P(1)1 through P(1)3 and P(2)1 through P(2)3 are established between the node vectors P(0)1 through P(0)3 on the one hand and P(3)1 on the other, a free curve is established whose shape is determined by the control point vectors P(0)1 through P(0)3, P(1)1 through P(1)3, P(2)1 through P(2)3 and P(3)1 through P(3)3, the shape passing through the node vectors P(0)1 through P(0)3 and P(3)1.

(3) Procedure for generating a sculptured surface between two free curves

Figure 4:
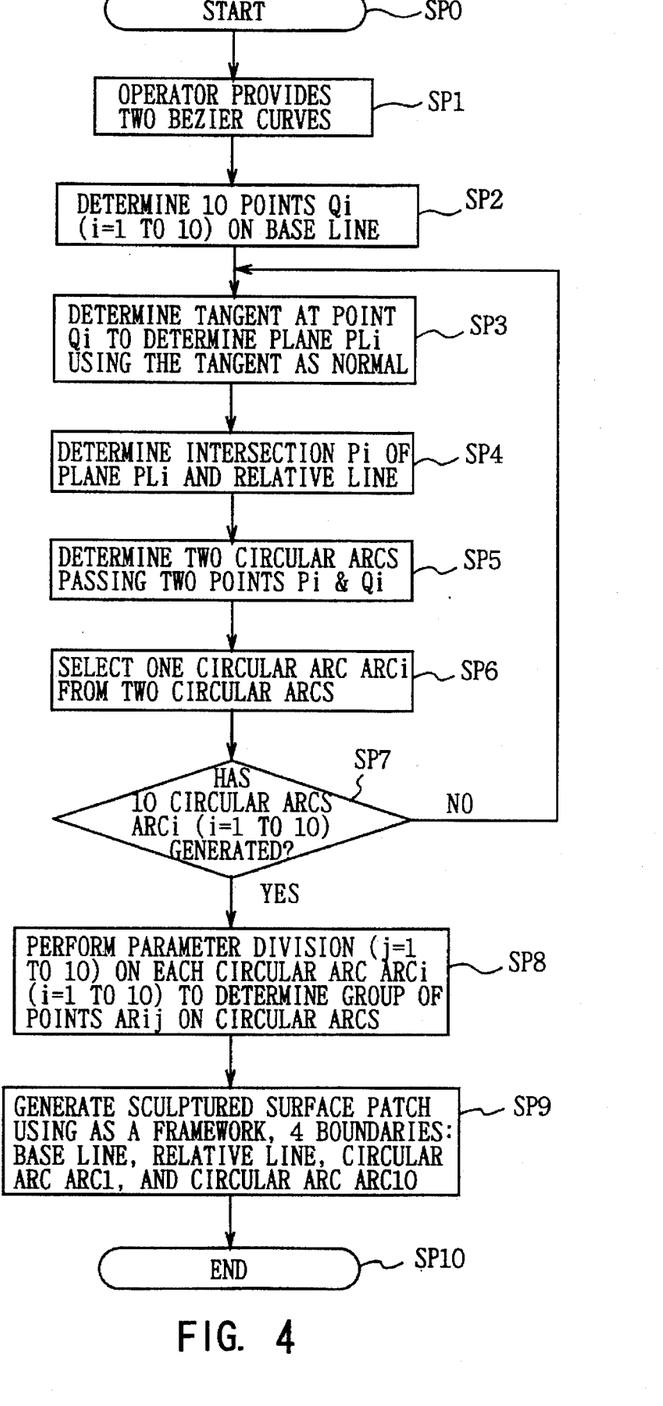
FIG. 4 is a flowchart showing a procedure for generating a sculptured surface between two free curves.
Figure 5:
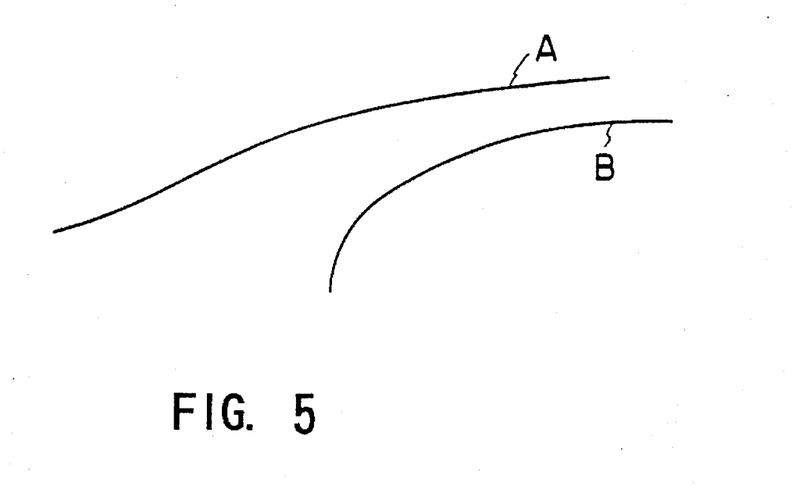
FIG. 5 is a schematic diagram showing two free curves specified by the operator.

The sculptured surface generating device 12 generates a sculptured surface between two free curves provided by the operator in the three-dimensional space and having a non-uniform distance between themselves, using a track obtained by moving a sphere between the two free curves. That is, in the procedure for generating a sculptured surface between two free curves shown in FIG. 4, the sculptured surface generating device 12 starts processing at step SP0 and proceeds to step SP1. As shown in FIG. 5, when the operator specifies two Bezier curve vectors A and B in the three-dimensional space, the data on the two vectors is loaded into the device. In this case, the Bezier curve vector A is used as a base line, while the Bezier curve vector B is used as a relative line.

In fact, base line vector A specified in this manner is defined by node vector PA0, vector PA3, internal control point vector PA1, and vector PA2, and expressed by the following equation:

$$A(t)=(1-t)^3 PA0+3(1-t)^2 tPA1+3(1-t)t^2PA2+t^3PA3 \quad (12)$$

that is obtained by modifying Equation (11).

Similarly, relative line vector B is defined by node vector PB0, vector PB3, internal control point vector PB1, and vector PB2, and expressed by the following equation:

$$B(t)=(1-t)^3 PB0+3(1-t)^2 tPB1+3(1-t)t^2PB2+t^3PB3 \quad (13)$$

that is obtained by modifying Equation (11).

At step SP2, the sculptured surface generating device 12 determines ten point vectors Qi (i=1 to 10) on base line vector A using parameter division. These point vectors Qi (i=1 to 10) are arbitrary points that can move on base line vector A, and are expressed by the following expression:

$$Qi(t)=(1-t)^3 PA0+3(1-t)^2 tPA1+3(1-t)t^2PA2+t^3PA3 \quad (14)$$

The sculptured surface generating device 12 then proceeds to step SP3 to determine a tangent of each of point vectors Qi on base line vector A. The tangent of point vector Qi can be expressed by the following expression:

$$Vi(t)=-3(1-t)^2 PA0+3(3t^2-4t-1)PA1+3(2t-3t^2)PA2+3t^{2+3}t^2PA3 \quad (15)$$

Figure 6:
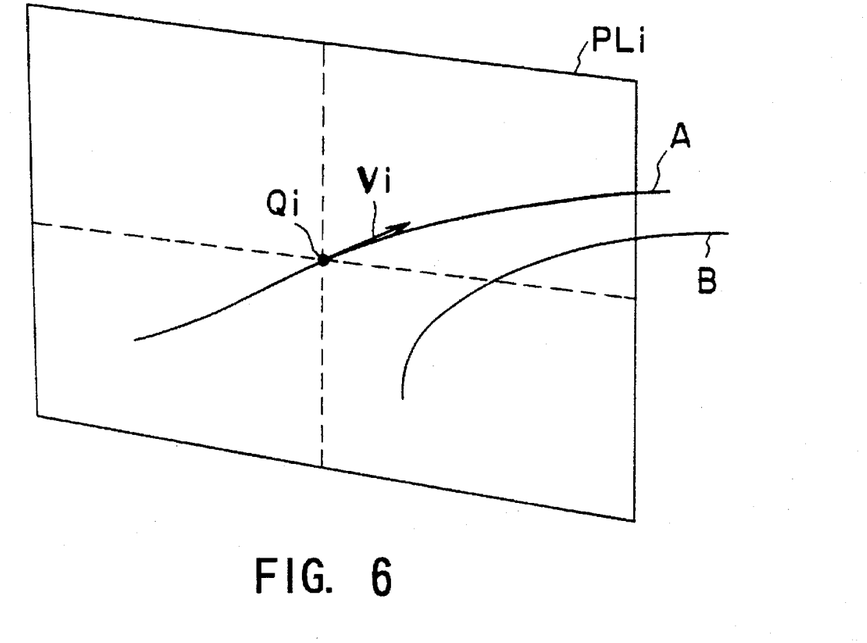
FIG. 6 is a schematic diagram showing a plane defined using, as the normal, a tangent at a point specified on one of the free curves in FIG. 5.

Since a plane can be defined by a single point and a normal, as shown in FIG. 6, tangential vector Vi of point vector Qi is defined as a normal to determine plane vector PLi from point vector Qi and normal vector Vi.

Figure 7:
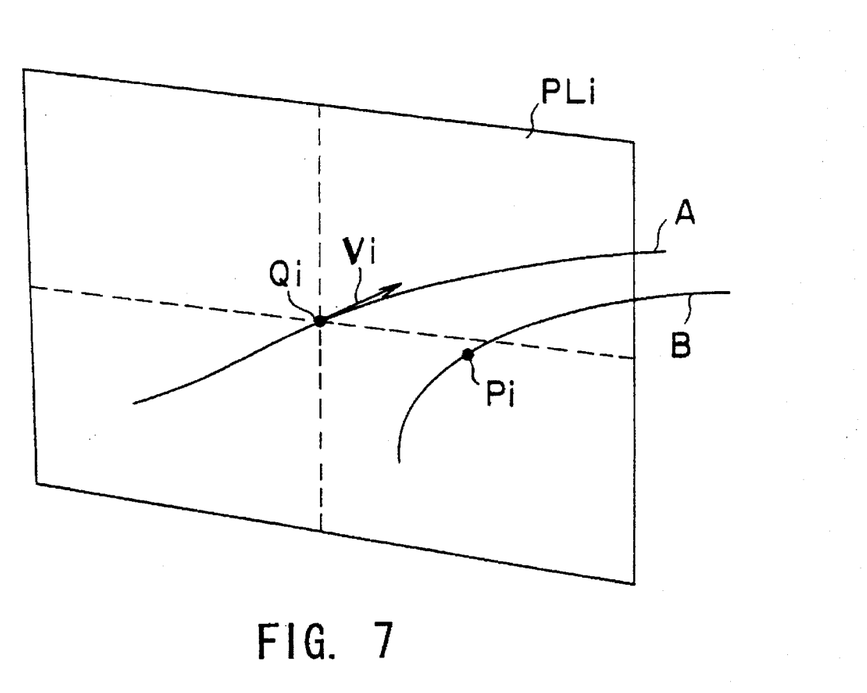
FIG. 7 is a schematic diagram showing the intersection of the plane in FIG. 6 and the other free curve.

After determining plane vector PLi at step SP3, the sculptured surface generating device 12 proceeds to step SP4. As shown in FIG. 7, the device determines point vector Pi on relative line vector B which corresponds to each of the point vector Qi on base line vector A. Point vector Pi can be determined from the intersection of plane vector PLi and relative line vector B.

Figure 8:
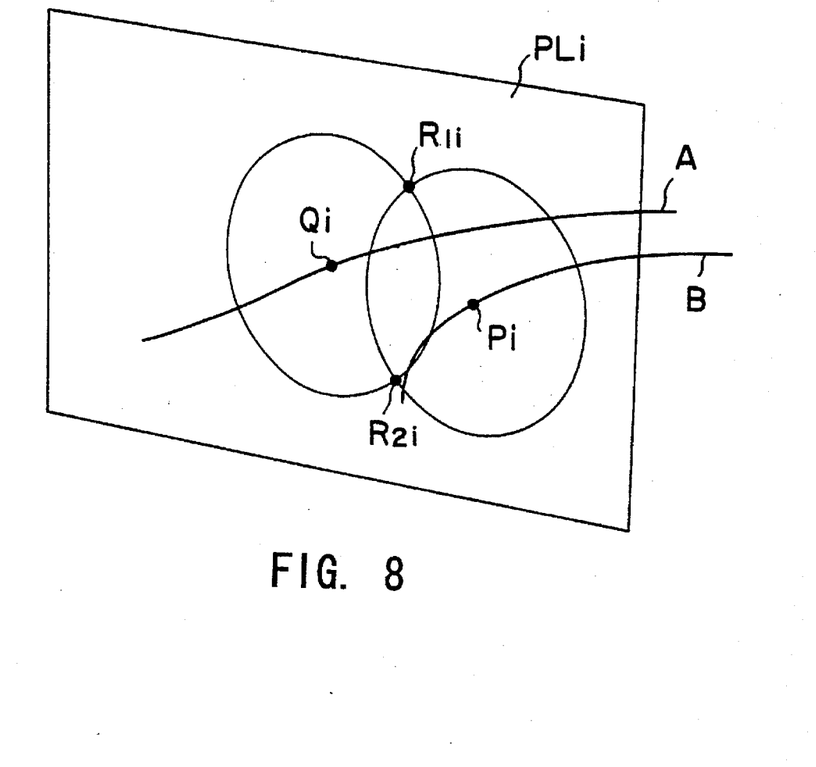
FIG. 8 is a schematic diagram showing the intersections of two circles drawn using the respective points on the two free curves in FIG. 7 as centers.

The sculptured surface generating device 12 then determines two circular arcs passing point vectors Pi and Qi at step SP5, as shown in FIG. 8. First, the end of the circular arcs is referred to as point vector Qi on base line vector A, while the beginning of the circular arcs is referred to as point vector Pi on relative line vector B. To locate the circular arcs on plane vector PLi, the centers of the circular arcs must exist on plane vector PLi. Circle vector C1i of an arbitrary radius "r" is thus generated on plane vector PLi using point vector Qi on base line vector A as the center of the circle.

Figure 9:
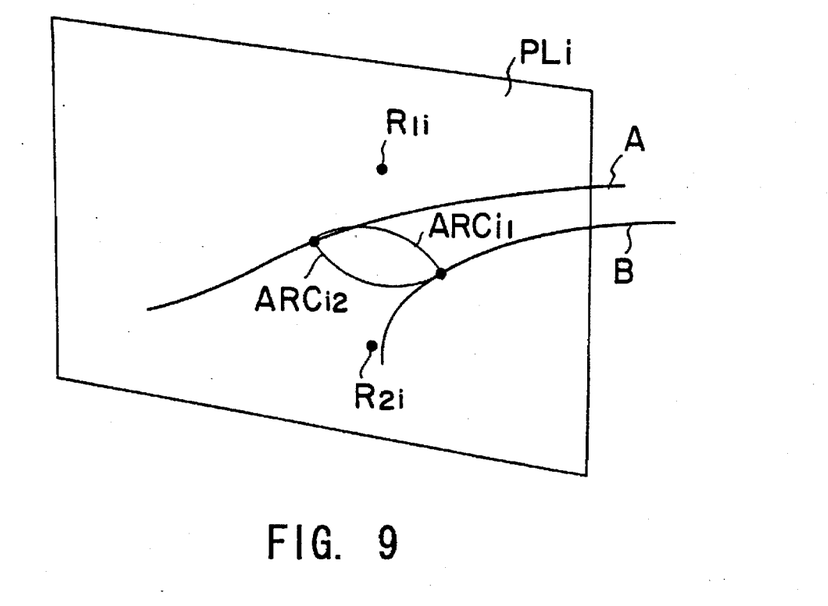
FIG. 9 is a schematic view showing circular arcs with the respective intersections of the circles in FIG. 8 as their centers.

Similarly, circle vector C2i of an arbitrary radius "r" is generated on plane vector PLi using point vector Pi on relative line vector B as the center of the circle. In this case, the intersections of circle vector C1i and circle vector C2i are referred to as vectors R1i and R2i, respectively. Circular arc vector ARCi1 with beginning vector Qi, end vector Pi, and radius "r" is then generated using intersection vector R1i of circle vector C1i and vector C2i, as shown in FIG. 9. Similarly, circular arc vector ARCi2 with beginning vector Qi, end vector Pi, and radius "r" is then generated using intersection vector R2i of circle vector C1i and vector C2i.

After two circular arc vectors ARCi1 and ARCi2 have been generated, the process proceeds to step SP6. First, directional vector from point vector Qi on base line vector A to point vector Pi on relative line vector B is referred to as vector Wi. If the cross product of tangential vector Vi and directional vector Wi at point vector Qi on base line vector A is referred to as vector Xi, it is expressed by the following expression:

$$Xi=Vi * Wi \quad (16)$$

Figure 10:
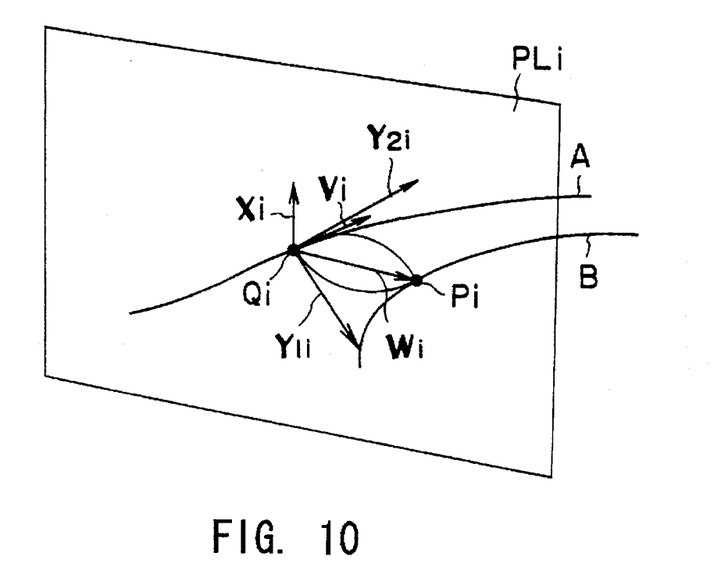
FIG. 10 is a schematic view showing tangential vectors of the respective circular arcs in FIG. 9 and their cross product.

In addition, as shown in FIG. 10, tangential vectors Y1i and Y2i at point vector Qi on both circular arc vectors ARC1i and ARC2i are expressed by the following equations:

$$Y1i=(R1i-Qi) * Vi \quad (17)$$

$$Y2i=(R2i-Qi) * Vi \quad (18)$$

Angle θ1i between cross product vector Xi and tangential vector Y1i can be expressed by the following equation:

$$\theta 1i=acos (Xi \cdot Y1i) \quad (19)$$

Angle θ2i between cross product vector Xi and tangential vector Y2i can be expressed by the following equation:

$$\theta 2i=acos (Xi \cdot Y2i) \quad (20)$$

In selecting from two circular arcs, circular arc ARC1i or ARC2i having tangential vector Y1i or Y2i close to cross product Xi is selected so that a plurality of circular arcs generated from point vector Qi (i=1 to 10) are all located on one side relative to point vectors Pi and Qi (i=1 to 10). That is, since the smaller of two angles θ1i, θ2i is selected, circular arc vector ARCi2 is selected if angle θ2i is smaller than angle θ1i, whereas circular arc vector ARCi1 is selected if angle θ1i is smaller than angle θ2i.

Figure 11:
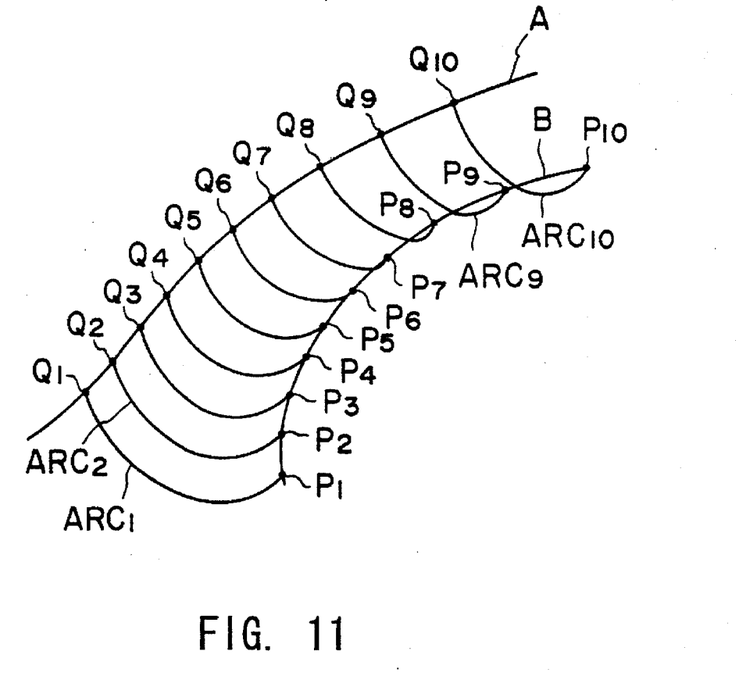
FIG. 11 is a schematic view showing a group of circular arcs generated from a group of points set on one of the free curves.

At step SP7, the process determines whether or not circular arc vectors ARCi (i=1 to 10) have been determined from all the ten point vectors Qi (i=1 to 10) on base line. If the result is negative, the process returns to step SP3 to continue processing. If the result is affirmative (FIG. 11), the process returns to step SP8 to determine point group vector ARij on each of the circular arcs by dividing each of the circular arc vectors ARCi (i=1 to 10) using parameter "j" (j=1 to 10).

Figure 12:
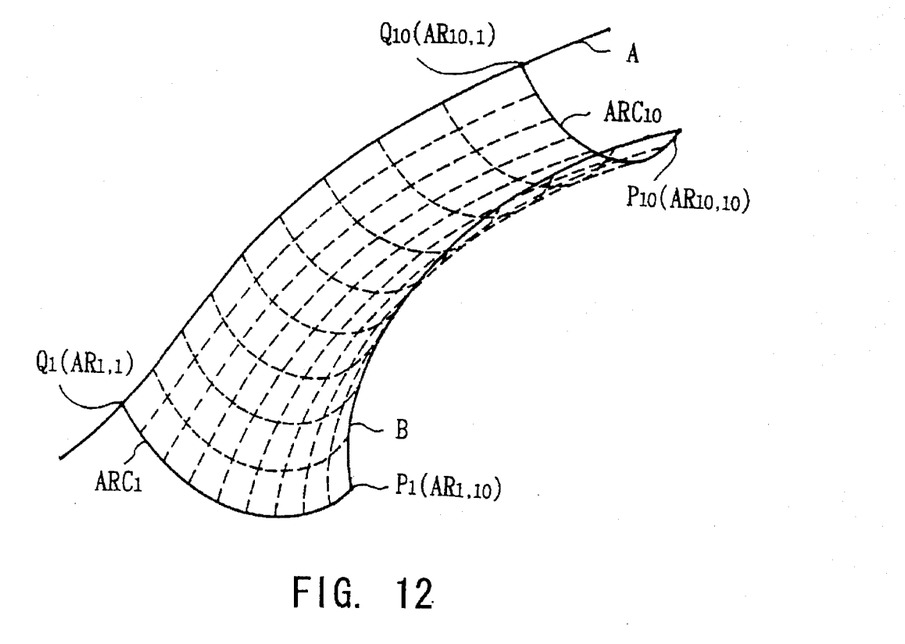
FIG. 12 is a schematic view showing a sculptured surface generated between the two free curves in FIG. 5.

The process then proceeds to step SP9 to generate a sculptured patch, as shown in FIG. 12, by means of least square approximation based on point group vector ARij (i, j=1 to 10) within four boundary curves: base line vector A, relative line vector B, circular arc vector ARC1, and circular arc vector ARC10. It terminates processing at step SP10. The method of least square approximation is disclosed in Ser. No. 08/267,838 which was filed by the same applicant on Jun. 28, 1994 and is now U.S. Pat. No. 5,410,645. Ser. No. 08/267,838 is a continuation of Ser. No. 07/853,918 filed on Mar. 19, 1994, now abandoned. The corresponding EP Patent Application was laid open on Sep. 23, 1992, published as 0504889 A2.

In generating a sculptured surface between two free curves spaced at a non-uniform distance using a track obtained by moving a sphere between the two free curves, the above configuration can generate a plane, determine the intersection of the relative line and the plane, generate circular arcs from the intersection, and generate a sculptured surface, thereby reducing processing time and enabling a sculptured surface of a uniform curvature to be generated. In addition, quality design reflecting the designer's sensitivity can be obtained.

(4) Other embodiments

Figure 13:
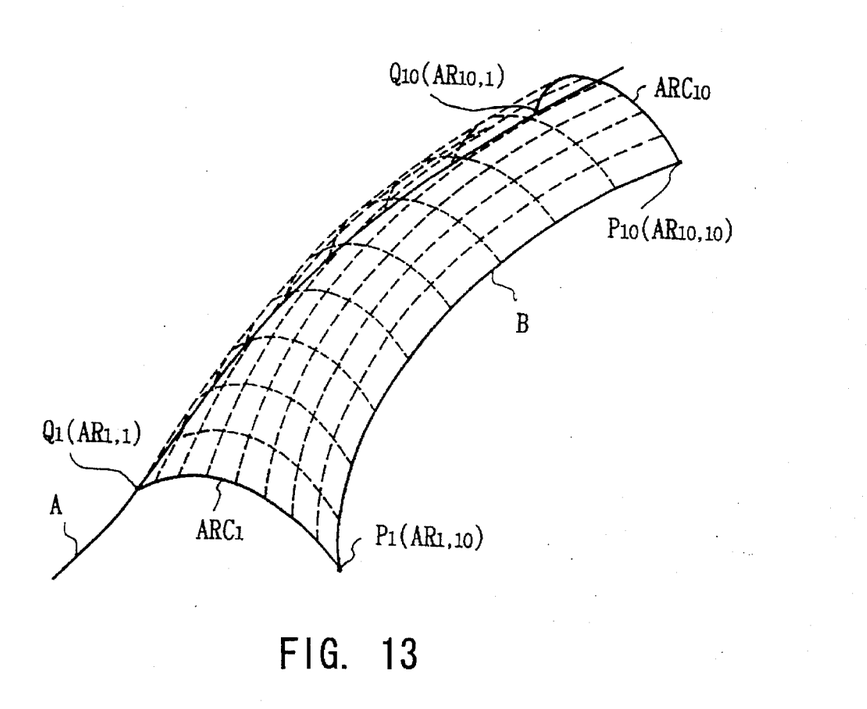
FIG. 13 is a schematic view showing another sculptured surface generated between the two free curves in FIG. 5.

In the above embodiment, in generating circular arcs, the smaller of angles θ1i and θ2i is selected to select a circular arc having a tangential vector constituting this angle. This invention is, however, not limited to this aspect, but the same effect can be produced by selecting the larger of angles θ1i and θ2i to select a circular arc having a tangential vector constituting this angle. A sculptured surface generated in this manner is shown in FIG. 13.

Figure 14A:
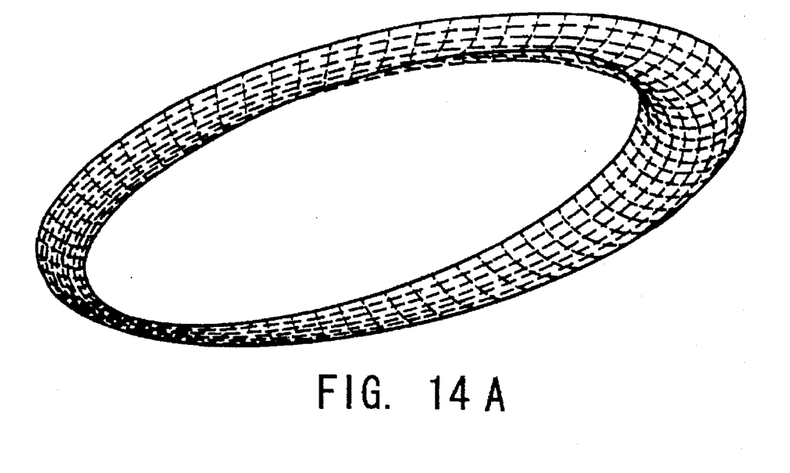
FIGS. 14A to 14C are schematic views showing examples of sculptured surfaces generated between two free curves.
Figure 14B:
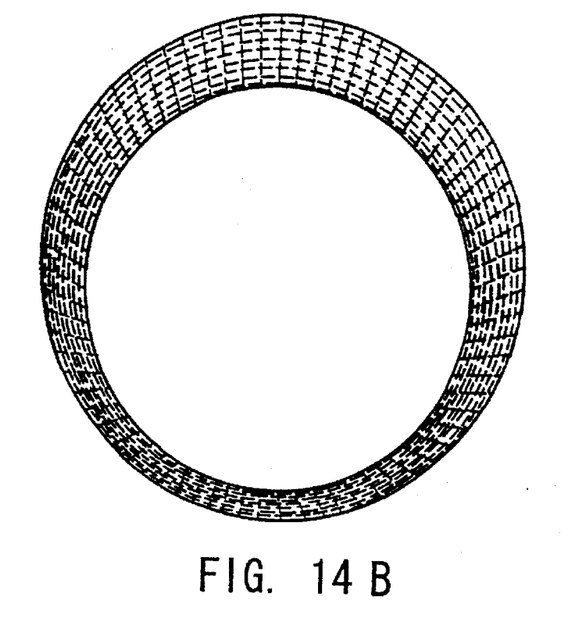
Figure 14C:
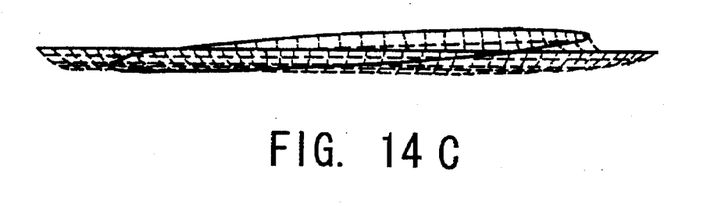

In addition, in the above embodiment, a sculptured surface is produced between two free curves spaced at a non-uniform distance. This invention is, however, not limited to this aspect, but a sculptured surface can be produced between two circles or two intersecting free curves spaced at a non-uniform distance, as shown in FIGS. 14A to 14C.

Furthermore, in the above embodiment, a sculptured surface is produced based on a plurality of circular arc vectors ARCi (i=1 to 10) generated using an arbitrary specified radius "r". This invention is, however, not limited to this aspect, but a sculptured surface can be produced based on a plurality of circular arcs of different radius.

As described above, this invention enables a sculptured surface of a specified radius to be generated easily between two free curves by generating a plane using, as the normal, a tangent at a base point on the first free curve; determining the intersection of the second free curve and the plane; generating circular arcs for each of the points on the first free curve using the base point and the intersection as endpoints; and generating a sculptured surface.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A method for generating a sculptured surface corresponding to a track of a sphere rotated between a first and a second free curves in a three-dimensional space, comprising the steps of:

setting a plurality of base points on said first free curve and generating a plurality of planes, each of said planes having each of said base points with a tangent of the first free curve at each of said base points to be a normal to said each plane;

determining a plurality of intersections of said second free curve and said plurality of planes;

generating a plurality of circular arcs of a specified radius on each of said plurality of planes using said base point and said intersection as endpoints; and generating a sculptured surface based on said first free curve, said second free curve, and said plurality of circular arcs.

2. The method for generating a sculptured surface according to claim 1 wherein said circular arcs are obtained by:

determining a first and a second circular arcs of a specified radius using said base point on said first free curve and said intersection on said second free curve as endpoints;

determining a cross product of a tangential vector of said free curve at said base point and a directional vector from said base point to said second free curve;

determining a first and a second tangents of said first and second circular arcs at said base point; and generating only said first or second circular arc with said first or second tangent, respectively, that is closer to said cross product.

3. The method for generating a sculptured surface according to claim 1 wherein said sculptured surface is approximately generated by means of least square approximation based on said first free curve, said second free curve, said plurality of circular arcs, and a group of points on a selected circular arc.

4. An apparatus for generating a sculptured surface corresponding to a track of a sphere rotated between a first free curve and a second free curve in a three-dimensional space, comprising:

a plane generation means for setting a plurality of base points on said first free curve and generating a plurality of planes, each of said planes having each of said base points with a tangent of said first free curve at each of said base points to be a normal to each of said planes;

an intersection detection means for determining a plurality of intersections of said second free curve and said plurality of planes generated by said plane generation means;

a circular arc generation means for generating a plurality of circular arcs of a specified radius on each of said plurality of planes using said base point and said intersection as endpoints; and a sculptured surface generation means for generating a sculptured surface based on said first free curve, said second free curve, and said plurality of circular arcs.

5. The apparatus for generating a sculptured surface according to claim 4 wherein said circular arc generation means comprises the steps of:

determining a first and a second circular arcs of a specified radius using said base point on said first free curve and said intersection on said second free curve as endpoints;

determining a cross product of a tangential vector of said first free curve at said base point and a directional vector from said base point to said second free curve;

determining a first and a second tangents of said first and second circular arcs at said base point; and generating only said first or second circular arc with said first or second tangent, respectively that is closer to said cross product.

6. The apparatus for generating a sculptured surface according to claim 4 wherein said sculptured surface generation means approximately generates a sculptured surface by means of least square approximation based on said first free curve, said second free curve, said plurality of circular arcs, and a group of points on a selected circular arc.

* * * * *